(12) United States Patent
MacLennan et al.

(10) Patent No.: US 7,627,555 B2
(45) Date of Patent: Dec. 1, 2009

(54) COMBINING MULTIDIMENSIONAL EXPRESSIONS AND DATA MINING EXTENSIONS TO MINE OLAP CUBES

(75) Inventors: C. James MacLennan, Redmond, WA (US); Pyungchul Kim, Sammamish, WA (US); ZhaoHui Tang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 282 days.

(21) Appl. No.: 10/873,676

(22) Filed: Jun. 22, 2004

(65) Prior Publication Data
US 2005/0283459 A1 Dec. 22, 2005

(51) Int. Cl.
G06F 7/00 (2006.01)
(52) U.S. Cl. .................................. 707/3; 707/104.1
(58) Field of Classification Search .............. 707/3, 707/6
See application file for complete search history.

(56) References Cited
U.S. PATENT DOCUMENTS

| | | |
|---|---|---|
| 6,205,447 B1 | 3/2001 | Malloy |
| 6,473,764 B1 | 10/2002 | Petculescu et al. |
| 6,687,693 B2 | 2/2004 | Cereghini et al. |
| 6,917,940 B1* | 7/2005 | Chen et al. ............. 707/10 |
| 7,007,020 B1* | 2/2006 | Chen et al. ............. 707/6 |
| 7,143,007 B2* | 11/2006 | Long et al. ............. 702/184 |
| 2003/0105658 A1* | 6/2003 | Chen et al. ............. 705/10 |
| 2003/0145000 A1 | 7/2003 | Arning et al. |
| 2003/0236784 A1 | 12/2003 | Tang et al. |
| 2004/0122820 A1 | 6/2004 | Malloy et al. |

OTHER PUBLICATIONS

Niemi et al., "Constructing OLAP Cubes Based on Queries", Nov. 9, 2001, ACM, 1-581, pp. 9-15.*
Wolfgang Hummer, et al., Xcube-XML For Data Warehouses, DOLAP'03, Nov. 7, 2003, pp. 33-40, New Orleans, Louisiana, USA.
Tapio Niemi, et al., Constructing an OLAP Cube from Distributed XML Data, DOLAP'02, Nov. 8, 2002, pp. 22-27, McLean, Virginia, USA.
Ole DB for Data Mining Specification, Version 1.0, Microsoft Corporation, Jul. 2000, pp. 1-133.
Jayavel Shanmugasundaram et al., Compressed Data Cubes for OLAP Aggregate Query Approximation on Continuous Dimensions, KDD-99, 1999, pp. 223-232, San Diego, California, USA.
E. Charran, "Introduction to Data Mining with SQL Server", 2002, pp. 1-13, Retrieved from the Internet: URL: http://www.sql-server-performance.com/ec_data_mining.asp.
Microsoft Corporation: "Ole DB for Data Mining Specification Version 1.0", Jul. 2000, Retrieved from the Internet URL:http://www.microsoft.com/downloads/details.aspx>, pp. 1-49.
Microsoft Corporation: "Ole DB for Data Mining Specification Version 1.0", Jul. 2000, Retrieved from the Internet URL:http://www.microsoft.com/downloads/details.aspx>, pp. 50-130.
A. Neta, et al., "Integrating data mining with SQL database: Ole DB for data mining", Proceedings 17th. International Conference on Data Engineering, vol. conf. 17, Apr. 2001, pp. 379-387.

(Continued)

*Primary Examiner*—Sathyanarayan Pannala
(74) *Attorney, Agent, or Firm*—Workman Nydegger

(57) ABSTRACT

A language schema that integrates multidimensional extensions (e.g., MDX) and data mining extensions (e.g., DMX) for performing data mining operations on data residing in OLAP cubes. The schema provides that the <source-data-query> can not only be a relational query, rather a multidimensional query formed using MDX, for example. The operations of model creation, training and prediction are described.

22 Claims, 5 Drawing Sheets

OTHER PUBLICATIONS

Z. Tang, "Building Data Mining Solutions with SQL Server 2000", 2001, pp. 1-6 Retrieved from the Internet: URL:http://www.dmreview.com/whitepaper/wid292.pdf>.

European Search Report mailed Nov. 21, 2006, for European Patent Application Serial No. 05 104 834.6, 4 Pages.

Eric Charran. Introduction to Data Mining with SQL Server. Jan. 8, 2003. 18 pages.

Chinese OA dated Feb. 4, 2008 for Chinese Application Serial No. 200510074012.X, 17 pages.

European OA dated Apr. 14, 2008 for European Application Serial No. 05 104 834.6, 8 pages.

European Search Report dated Nov. 13, 2006 for European Patent Application Serial No. 05 104 834.6, 3 Pages.

\* cited by examiner

COMBINING MULTIDIMENSIONAL EXPRESSIONS AND DATA MINING EXTENSIONS TO MINE OLAP CUBES

TECHNICAL FIELD

This invention is related to databases, and more specifically, to methods for searching and analyzing such databases.

BACKGROUND OF THE INVENTION

The advent of a global communications network such as the Internet has perpetuated the exchange of enormous amounts of information. Additionally, the costs to store and maintain such information have declined, resulting in massive data storage structures that then need to be accessed. Enormous amounts of data can be stored as a data warehouse, which is a database that typically represents the business history of an organization. The history data is used for analysis that supports business decisions at many levels, from strategic planning to performance evaluation of a discrete organizational unit. It can also involve taking the data stored in a relational database and processing the data to make it a more effective tool for query and analysis. In order to more efficiently manage data warehousing at a smaller scale, the concept of a data mart is employed in which only a targeted subset of the data is managed.

Whereas many languages used for data definition and manipulation, such as SQL (Structured Query Language), are designed to retrieve data in two dimensions, multidimensional data, on the other hand, can be represented by structures with more than two dimensions. These multidimensional structures are called cubes. A cube is a multidimensional database that represents data similar to a 3-D spreadsheet rather than a relational database. The cube allows different views of the data to be displayed quickly by employing concepts of dimensions and measures. Dimensions define the structure of the cube (e.g., geographical location or a product type), while measures provide the quantitative values of interest to the end user (e.g., sales dollars, inventory amount, and total expenses). Cell positions in the cube are defined by the intersection of dimension members, and the measure values are aggregated to provide the values in the cells.

The information in a data warehouse or a data mart can be processed using online analytical processing (OLAP). OLAP views data as cubes. OLAP enables data warehouses and data marts to be used effectively for online analysis and providing rapid responses to iterative complex analysis queries. OLAP systems provide the speed and flexibility to support analysis in real time.

One conventional architecture that can facilitate OLAP for multidimensional query and analysis is MDX (Multi-Dimensional expressions). MDX is a syntax that supports the definition and manipulation of multidimensional objects and data thereby facilitating the access of data from multiple dimensions easier and more intuitive. MDX is similar in many ways to the SQL (Structured Query Language) syntax (but is not an extension of the SQL language). As with an SQL query, each MDX query requires a data request (the SELECT clause), a starting point (the FROM clause), and a filter (the WHERE clause). These and other keywords provide the tools used to extract specific portions of data from a cube for analysis. MDX also supplies a robust set of functions for the manipulation of retrieved data, as well as the ability to extend MDX with user-defined functions.

Data mining is about finding interesting structures in data (e.g., patterns and rules) that can be interpreted as knowledge about the data or may be used to predict events related to the data. These structures take the form of patterns that are concise descriptions of the data set. Data mining makes the exploration and exploitation of large databases easy, convenient, and practical for those who have data but not years of training in statistics or data analysis. The "knowledge" extracted by a data mining algorithm can have many forms and many uses. It can be in the form of a set of rules, a decision tree, a regression model, or a set of associations, among many other possibilities. It may be used to produce summaries of data or to get insight into previously unknown correlations. It also may be used to predict events related to the data—for example, missing values, records for which some information is not known, and so forth. There are many different data mining techniques, most of them originating from the fields of machine learning, statistics, and database programming.

What is needed is a schema that facilitates interaction of data mining operations across OLAP cubes.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a formal language that integrates multidimensional extensions (e.g., MDX) and data mining extensions (e.g., DMX) for performing data mining operations on data residing in OLAP cubes. Data Mining operations generally perform operations on a set of source data indicated by a <source-data-query>. To date the <source-data-query> elements have been limited to relational queries acting directly against a relational database, or a SHAPE statement that takes relational queries and forms them into a nested rowset. This invention provides that the <source-data-query> can not only be a relational query, rather a multidimensional query formed using MDX, for example.

In another aspect of the present invention, data mining models are used to perform predictions against data contained inside an OLAP cube.

In another aspect thereof, with respect to model creation, this invention states that upon creation, the source data type is unknown and is not set until the training phase. In conventional systems, the "type" of the model was implied upon creation, the type being a relational-sourced or OLAP-sourced model.

Moreover, a mining model can be trained from an arbitrary data source regardless of its relational or multidimensional nature. Column binding is handling consistently by explicit column order in both multidimensional and relational sources, unlike conventional systems where column binding is implied through name matching between the mining model and the OLAP cube.

Furthermore, a mining model can take as a data source for prediction, an arbitrary data source, regardless of its relational or multidimensional nature. The disclosed architecture allows prediction to occur using DMX, and allows the OLAP cube to source predictions from any model, regardless of how it was created or trained. Conventionally, prediction against data in an OLAP cube is carried out in MDX, and only using mining models trained on the same cube.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
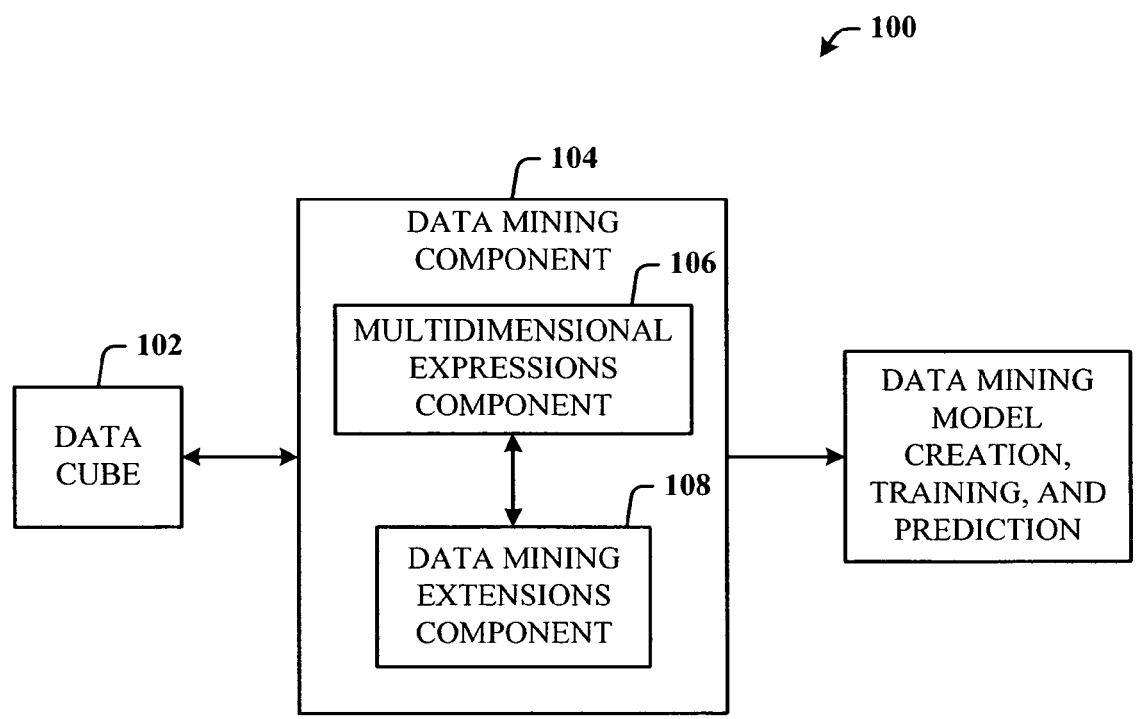
FIG. 1 illustrates a system that facilitates multidimensional expression and data mining extension integration in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The invention provides architecture for integrating multi-dimensional extensions and data mining extensions for performing data mining operations on data residing in OLAP cubes. Currently, the <source-data-query> elements have been limited to relational queries acting directly against a relational database, or a SHAPE statement that takes relational queries and forms them into a nested rowset. This invention provides that the <source-data-query> can not only be a relational query, but rather a multidimensional query formed using multidimensional extensions.

One way in which this can be accomplished is via MDX and DMX. MDX is an acronym for MultiDimensional eXpressions, as defined by the OLE DB for OLAP Specification, by Microsoft Corporation, the entirety of which is incorporated by reference. DMX is an acronym for Data Mining eXtensions, as defined by the OLE DB for Data Mining Specification, by Microsoft Corporation, the entirety of which is incorporated by reference. For the purposes of this description, the operations of model creation, model training, and prediction against new data are described.

In DMX, these operations are performed using the statements CREATE MINING MODEL, INSERT INTO, and SELECT ... PREDICTION JOIN. For example:

```
CREATE MINING MODEL MyModel
(
    CustomerID      LONG        KEY,
    Age             LONG        CONTINUOUS,
    Gender          TEXT        DISCRETE,
    Occupation      TEXT        DISCRETE,
    HomeOwner       BOOLEAN     DISCRETE,
    TotalSales      DOUBLE      CONTINUOUS
    MemberCard      TEXT        DISCRETE PREDICT
    Products        TABLE
    (
        ProductID               TEXT KEY
    )
) USING Microsoft_Decision_Trees
INSERT INTO MyModel(CustomerID, Age, Gender, Occupation,
        HomeOwner, TotalSales, MemberCard,
        Products(Product))
    <source-data-query>
SELECT Predict(MemberCard) FROM MyModel PREDICTION JOIN
    <source-data-query> as t
ON MyModel.Age = t.Age, MyModel.Gender = t.Gender, ... ,
    MyModel.Products.ProductID=t.Products.ProductID
```

Referring now to FIG. 1, there is illustrated a system 100 that facilitates multidimensional expression and data mining extension integration in accordance with the present invention. There is provided a multidimensional data source (e.g., an OLAP (On-Line Analytical Processing) cube) 102 on which data mining is to be performed. A data mining component 104 includes a multidimensional expression component 106 (e.g., MDX) and a data mining extensions component 108 together which facilitate data mining of the OLAP cube 102. An output of the data mining component is data that is used as input to data mining model creation, training, and prediction.

In an alternative implementation, it is to be appreciated that it is not required that both the multidimensional expression component 106 and the data mining extensions component 108 reside in the single overall data mining component 104, but either can be a separate external entity from the data mining component 104. Thus, the components (106 and 108) can be independent such that one feeds the other.

Figure 2:
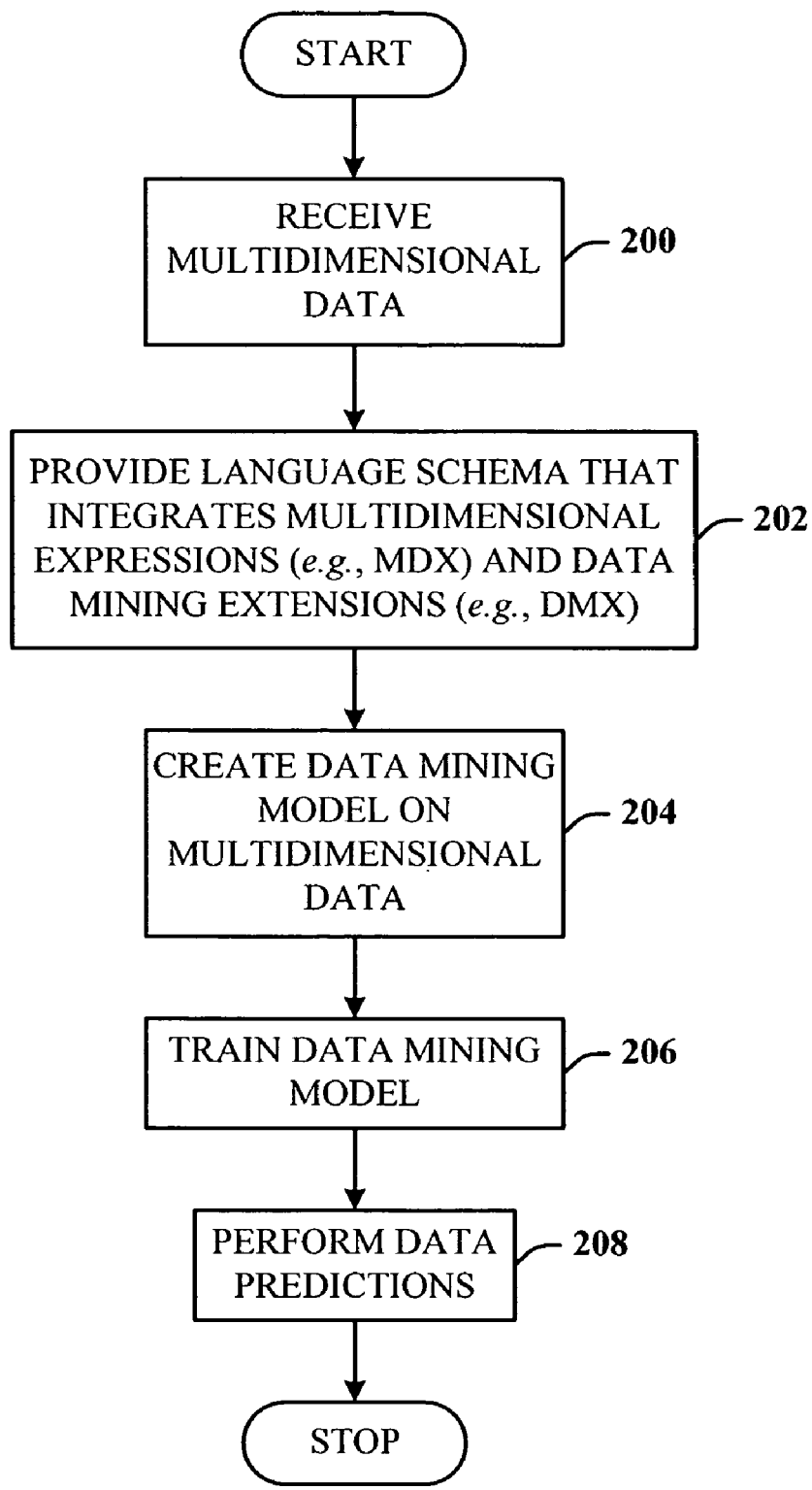
FIG. 2 illustrates a flow chart of one methodology of multidimensional data mining in accordance with the present invention.

Referring now to FIG. 2, there is illustrated a flow chart of one methodology of multidimensional data mining in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, multidimensional data is provided for data mining. At 202, the language schema is provided that integrates the multidimensional extensions and data mining extensions, and operates on the multidimensional data. At 204, a data mining model is created from the multidimensional data. At 206, the data mining model is trained on the data. At 208, predications can now be made on new data using the data mining extensions. The process then reaches a Stop block.

Figure 3:
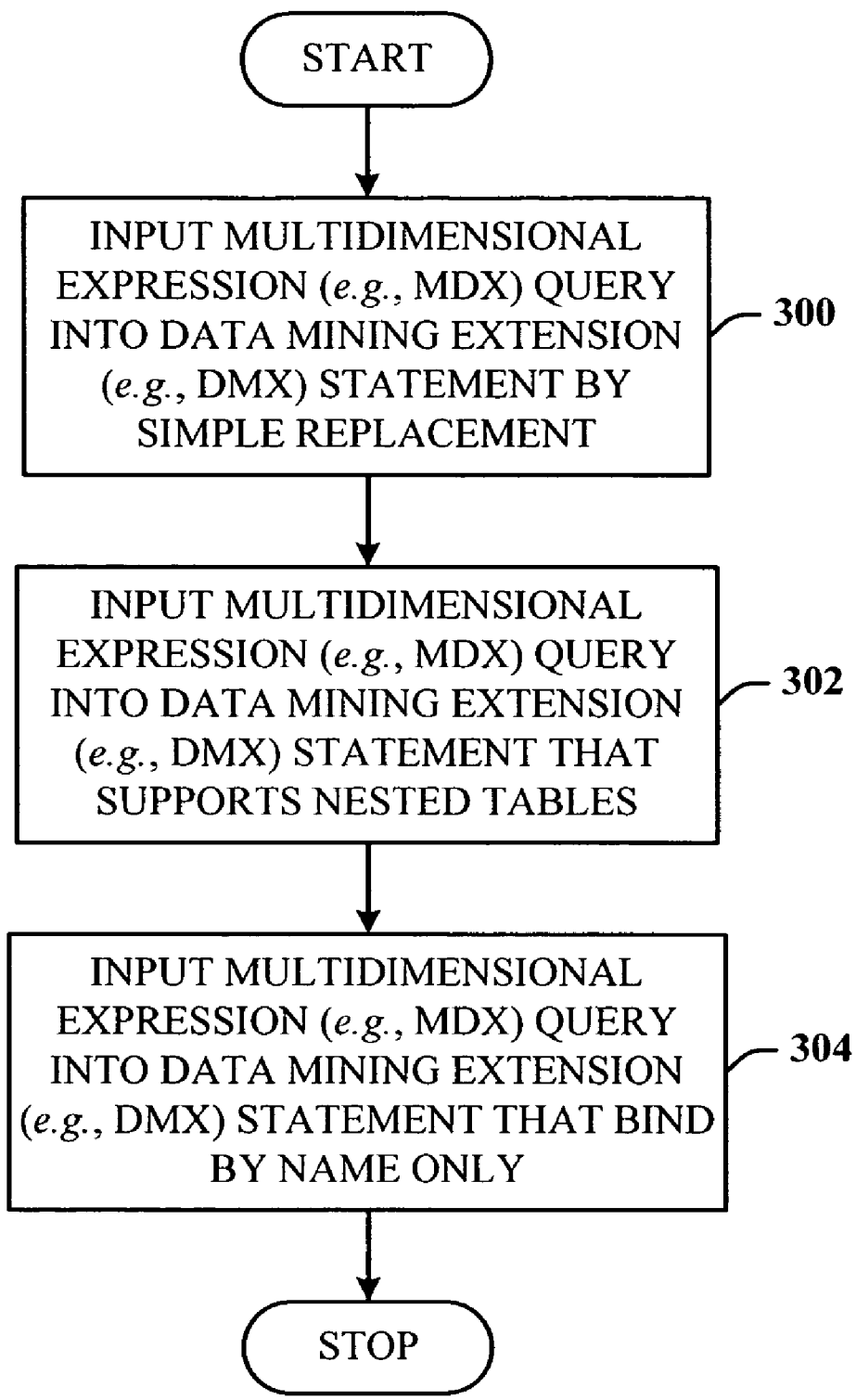
FIG. 3 illustrates a flow chart of examplary ways to use multidimensional expressions as inputs to data mining extensions in accordance with the present invention.

Referring now to FIG. 3, there is illustrated a flow chart of examplary ways to use multidimensional expressions as inputs to data mining extensions in accordance with the present invention. Data mining extension queries traditionally expect relational tables as their data sources. These queries can accept either a flat table as input, or a nested table created through the use of the SHAPE directive. Binding is done either by column order—as in the INSERT INTO statement, or by explicit mapping using an ON clause, as in the SELECT . . . PREDICTION JOIN statement. For example:

```
INSERT INTO MyModel(CustomerID, Age, Gender, Occupation,
HomeOwner,
        TotalSales, MemberCard,
        Products(SKIP, ProductID))
    SHAPE (SELECT CustomerID, Age, Gender, Occupation,
HomeOwner, TotalSales, MemberCard
        FROM MyTable)
    APPEND { (SELECT CustomerID, ProductID From ProductFacts )
        RELATE CustomerID to CustomerID} as Products
    SELECT Predict (MemberCard) FROM MyModel PREDICTION
JOIN
    SHAPE (SELECT CustomerID, Age, Gender, Occupation,
HomeOwner, TotalSales, MemberCard
        FROM MyTable)
    APPEND { (SELECT CustomerID, ProductID From ProductFacts )
        RELATE CustomerID to CustomerID} as Products as t
    ON MyModel.Age = t.Age, MyModel.Gender = t.Gender, . . . ,
        MyModel.Products.ProductID=t.Products.ProductID
```

The disclosed invention allows for multiple ways of using multidimensional extensions queries (e.g., MDX) as inputs to data mining extension statements (e.g., DMX). By way of example and not by limitation, the following description uses MDX and DMX as one way in which to carry out the present invention. At 300, a first way is by simple replacement of the relational query with an MDX query. For example, the query,

```
SELECT CustomerID, Age, Gender, Occupation, HomeOwner,
TotalSales, MemberCard
    FROM MyTable
``` can be expressed in an MDX cube as,

```
SELECT Measures.TotalSales ON COLUMNS,
        Customers.Members DIMENSION PROPERTIES CustomerID,
Age, Gender, Occupation, HomeOwner, MemberCard ON ROWS
    FROM MyCube
```

In another example, the following query,

SELECT CustomerID, ProductID From ProductFacts can be expressed as,

```
SELECT . ON COLUMNS,
    NON EMPTY CROSSJOIN(Customers, Products)
        DIMENSION PROPERTIES Customer.CustomerID, Products.
    ProductID
```

```
ON ROWS
    FROM MyCube
```

Thus, in this first form, the MDX expressions can be substituted for the relational queries.

At 302, a second form allows for the elimination of the SHAPE construct by taking advantage of the inherent multidimensional structure of the cube. The above shaped relational queries can then be written in MDX as,

```
SELECT Measures.TotalSales ON COLUMNS,
        Customers.Members DIMENSION PROPERTIES CustomerID, Age,
            Gender, Occupation, HomeOwner, MemberCard ON ROWS,
        NON EMPTY Products.Members DIMENSION PROPERTIES
            ProductID on PAGES
    FROM MyCube
```

Additional nested tables can be arranged on additional axes.

At 304, a third form of the invention involves statements that bind by name only, e.g., SELECT, PREDICTION, and JOIN. In this form the data mining extension processor takes advantage of the cube structure, allowing for simpler queries, expanding the ON clause to extract information from the MDX query. For example,

```
SELECT Predict(MemberCard) FROM MyModel PREDICTION JOIN
SELECT Measures.TotalSales ON COLUMN,
    Customers.Members ON ROWS,
    NON EMPTY Products ON PAGES
FROM MyCube as t
ON MyModel.Age = t.Customers.Age,
    MyModel.Gender = t.Customers.Gender,
    MyModel.Occupation = t.Customers.Occupation,
    . . .
    MyModel.TotalSales = t.TotalSales,
    MyModel.Products.ProductID = t.Products.ProductID
```

With respect to model creation, this invention states that upon creation, the source data type is unknown and is not set until the training phase. In conventional systems, the "type" of the model was implied upon creation, the type being a relational-sourced or OLAP-sourced model.

A mining model can be trained from an arbitrary data source regardless of its relational or multidimensional nature. Column binding is handling consistently by explicit column order in both multidimensional and relational sources, unlike conventional systems where column binding is implied through name matching between the mining model and the OLAP cube.

A mining model can take as a data source for prediction, an arbitrary data source, regardless of its relational or multidimensional nature. Conventionally, prediction against data in an OLAP cube can only be carried out in MDX, and only using mining models trained on the same cube. The disclosed architecture allows prediction to occur using DMX, and allows the OLAP cube to source predictions from any model, regardless of how it was created or trained.

Figure 4:
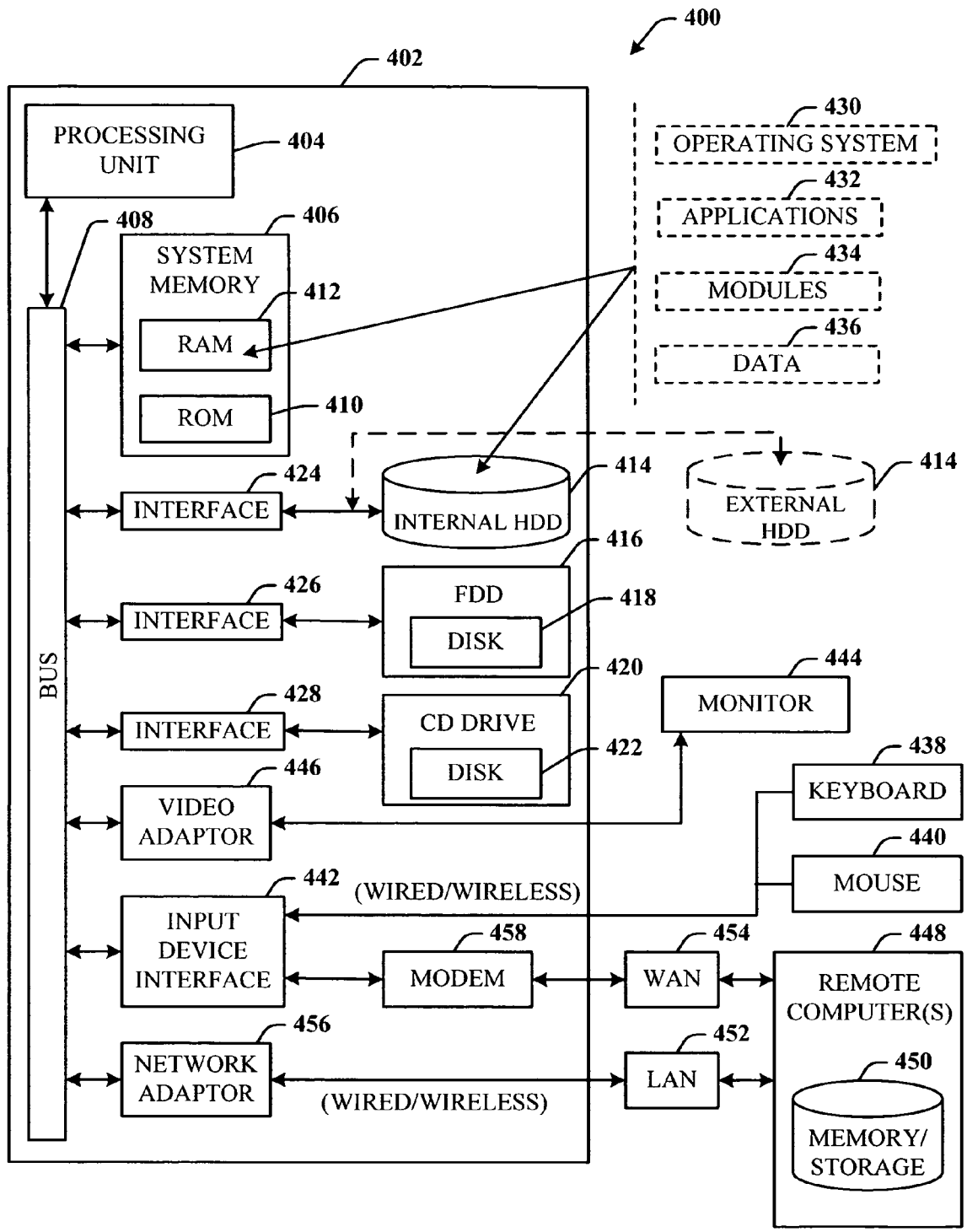
FIG. 4 illustrates a block diagram of a computer operable to execute the disclosed architecture.

Referring now to FIG. 4, there is illustrated a block diagram of a computer operable to execute the disclosed architecture. In order to provide additional context for various aspects of the present invention, FIG. 4 and the following discussion are intended to provide a brief, general description of a suitable computing environment 400 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 4, there is illustrated an exemplary environment 400 for implementing various aspects of the invention that includes a computer 402, the computer 402 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read only memory (ROM) 410 and random access memory (RAM) 412. A basic input/output system (BIOS) is stored in a non-volatile memory 410 such as ROM, EPROM, EEPROM, which BIOS contains the basic routines that help to transfer information between elements within the computer 402, such as during start-up. The RAM 412 can also include a high-speed RAM such as static RAM for caching data.

The computer 402 further includes an internal hard disk drive (HDD) 414 (e.g., EIDE, SATA), which internal hard disk drive 414 may also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 412, including an operating system 430, one or more application programs 432, other program modules 434 and program data 436. All or portions of the operating system, applications, modules, and/or data can also be cached in the RAM 412.

It is appreciated that the present invention can be implemented with various commercially available operating systems or combinations of operating systems.

A user can enter commands and information into the computer 402 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE 1394 serial port, a game port, a USB port, an IR interface, etc.

A monitor 444 or other type of display device is also connected to the system bus 408 via an interface, such as a video adapter 446. In addition to the monitor 444, a computer typically includes other peripheral output devices (not shown), such as speakers, printers etc.

The computer 402 may operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices, and companies, and facilitate enterprise-wide computer networks, such as intranets, all of which may connect to a global communication network, e.g., the Internet.

When used in a LAN networking environment, the computer 402 is connected to the local network 452 through a wired and/or wireless communication network interface or adapter 456. The adaptor 456 may facilitate wired or wireless communication to the LAN 452, which may also include a wireless access point disposed thereon for communicating with the wireless adaptor 456. When used in a WAN networking environment, the computer 402 can include a modem 458, or is connected to a communications server on the LAN, or has other means for establishing communications over the WAN 454, such as by way of the Internet. The modem 458, which can be internal or external and a wired or wireless device, is connected to the system bus 408 via the serial port interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 5:
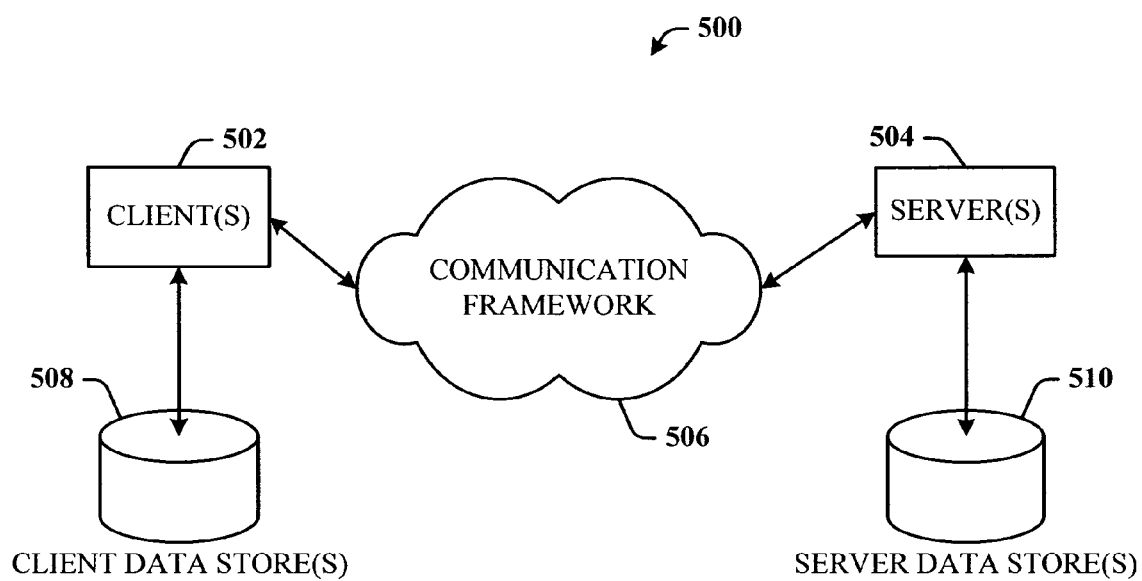
FIG. 5 illustrates a schematic block diagram of an exemplary computing environment in accordance with the present invention.

Referring now to FIG. 5, there is illustrated a schematic block diagram of an exemplary computing environment 500 in accordance with the present invention. The system 500 includes one or more client(s) 502. The client(s) 502 can be hardware and/or software (e.g., threads, processes, computing devices). The client(s) 502 can house cookie(s) and/or associated contextual information by employing the present invention, for example. The system 500 also includes one or more server(s) 504. The server(s) 504 can also be hardware and/or software (e.g., threads, processes, computing devices). The servers 504 can house threads to perform transformations by employing the present invention, for example. One possible communication between a client 502 and a server 504 can be in the form of a data packet adapted to be transmitted between two or more computer processes. The data packet may include a cookie and/or associated contextual information, for example. The system 500 includes a communication framework 506 (e.g., a global communication network such as the Internet) that can be employed to facilitate communications between the client(s) 502 and the server(s) 504.

Communications can be facilitated via a wired (including optical fiber) and/or wireless technology. The client(s) 502 are operatively connected to one or more client data store(s) 508 that can be employed to store information local to the client(s) 502 (e.g., cookie(s) and/or associated contextual information). Similarly, the server(s) 504 are operatively connected to one or more server data store(s) 510 that can be employed to store information local to the servers 504.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer program product of use at a computer system the computer program product for implementing a method for data mining on a multidimensional data cube, the computer program product comprising one or more computer storage media having stored thereon computer-executable instructions that, when executed at a processor, cause the computer system to perform the method, including performing the following:

access multidimensional data;

access multidimensional expressions defining how to view the multidimensional data as a multidimensional data cube;

access data mining extensions for performing data mining on data residing in the multidimensional data cube;

integrate the multidimensional expressions and the data mining extensions into input for data mining model creation;

create a data mining model trained on the multidimensional data from the input;

store the data mining model;

perform data predictions against data contained in the multidimensional data cube by data mining the multidimensional data cube in accordance with the data mining model, data mining including performing data mining operations on portions of data contained in the multidimensional data cube in accordance with a multidimensional query element.

2. The computer program product of claim 1, wherein the multidimensional data cube comprises an on-line analytical processing (OLAP) cube.

3. The computer program product of claim 1, wherein the multidimensional expressions correspond to MICROSOFT Multi-Dimensional Expression (MDX) specification.

4. The computer program product of claim 1, wherein the data mining extensions correspond to MICROSOFT Data Mining Extension (DMX) specification.

5. The computer program product of claim 1, wherein computer-executable instructions that, when executed, cause the computer system to create the data mining model comprise computer-executable instructions that, when executed, cause the computer system to create a data mining model having a source data type that is unknown and subsequently set to one of a relational-sourced or multidimensional-sourced model during a training phase.

6. The computer program product of claim 1, wherein computer-executable instructions that, when executed, causes the computer system to create the data mining model comprise computer-executable instructions that, when executed, cause the computer system to arrange a nested table on an additional axis.

7. The computer program product of claim 1, wherein computer-executable instructions that, when executed, cause the computer system to create the data mining model comprise computer-executable instructions that, when executed, cause the computer system to train the data mining model from an arbitrary data source.

8. The computer program product of claim 1, wherein computer-executable instructions that, when executed, cause the computer system to create the data mining model comprise computer-executable instructions that, when executed, cause the computer system to create a data mining model having a source data type that is unknown and subsequently set to one of a relational-sourced or multi-dimensional-sourced model during a training phase.

9. The computer program product of claim 1, further comprising computer-executable instructions that, when executed, cause the computer system to provide a language schema for integrating the multidimensional expressions and the data mining extensions; and wherein computer-executable instructions that, when executed, cause the computer system to integrate the multidimensional expressions and the data mining extensions into input for data mining model creation comprise computer-executable instructions that, when executed, cause the computer system to integrate the multidimensional expressions and the data mining extensions into input for data mining model creation in accordance with the provided language schema.

10. The computer program product of claim 9, wherein computer-executable instructions that, when executed, cause the computer system to integrate the multidimensional expressions and the data mining extensions into input for data mining model creation in accordance with the provided language schema comprise computer-executable instructions that, when executed, cause the computer system to integrate the multidimensional expressions and the data mining extensions by utilizing an inherent multidimensional structure of the multidimensional data cube to write a relational query as a multidimensional expression.

11. The computer program product of claim 9, wherein computer-executable instructions that, when executed, cause the computer system to integrate the multidimensional expressions and the data mining extensions into input for data mining model creation in accordance with the provided language schema comprise computer-executable instructions that, when executed, cause the computer system to integrate the multidimensional expressions and the data mining extensions by defining statements that bind by name only so as to take advantage of the cube structure to enable simpler queries.

12. The computer program product of claim 9, wherein computer-executable instructions that, when executed, cause the computer system to integrate the multidimensional expressions and the data mining extensions into input for data mining model creation in accordance with the provided language schema comprise computer-executable instructions that, when executed, cause the computer system to integrate the multidimensional expressions and the data mining extensions by accepting a multidimensional extension that replaces an relational query with an integrated expression.

13. At a computer system, the computer system including a processor and system memory, a computer implemented method for data mining on a multidimensional data cube, comprising:

accessing multidimensional data;

accessing multidimensional expressions defining how to view the multidimensional data as a multidimensional data cube;

accessing data mining extensions for performing data mining on data residing in the multidimensional cube;

integrating the multidimensional expressions and the data mining extensions into input for data mining model creation;

the processor creating a data mining model trained on the multidimensional data from the input;

storing the data mining model;

performing data predictions against data contained in the multidimensional data cube by data mining the multidimensional data cube in accordance with the data mining model, data mining including performing data mining operations on portions of data contained in the multidimensional data cube in accordance with a multidimensional query element.

14. The method of claim 13, wherein the multidimensional data cube is an on-line analytical processing (OLAP) cube.

15. The method of claim 13, wherein the multidimensional expressions correspond to MICROSOFT Multi-Dimensional Expression (MDX) specification.

16. The method of claim 13, wherein the data mining extensions correspond to MICROSOFT Data Mining Extension (DMX) specification.

17. The method of claim 13, wherein creating the data mining model comprises arranging an additional nested table on an additional axis.

18. The method of claim 13, wherein creating the data mining model comprises training the data mining model from an arbitrary data source.

19. The method of claim 13, further comprising providing a language schema for integrating the multidimensional expressions and the data mining extensions; and wherein integrating the multidimensional expressions and the data mining extensions into input for data mining model creation comprises integrating the multidimensional expressions and the data mining extensions into input for data mining model creation in accordance with the provided language schema.

20. The method as recited in claim 19, wherein integrating the multidimensional expressions and the data mining extensions into input for data mining model creation in accordance with the provided language schema comprises integrating the multidimensional expressions and the data mining extensions by utilizing an inherent multidimensional structure of the multidimensional data to write a relational query as a multidimensional expression.

21. The method as recited in claim 19, wherein integrating the multidimensional expressions and the data mining extensions into input for data mining model creation in accordance with the provided language schema comprises integrating the multidimensional expressions and the data mining extensions by defining statements that bind by name only so as to take advantage of the cube structure to enable simpler queries.

22. The method as recited in claim 19, wherein integrating the multidimensional expressions and the data mining extensions into input for data mining model creation in accordance with the provided language schema comprises integrating the multidimensional expressions and the data mining extensions by accepting a multidimensional extension that replaces an relational query with an integrated expression.

* * * * *